March 11, 1969 R. G. LOVE 3,431,785
TEMPERATURE COMPENSATING SYSTEM FOR DENSITY METERS
Filed May 10, 1966 Sheet 1 of 2
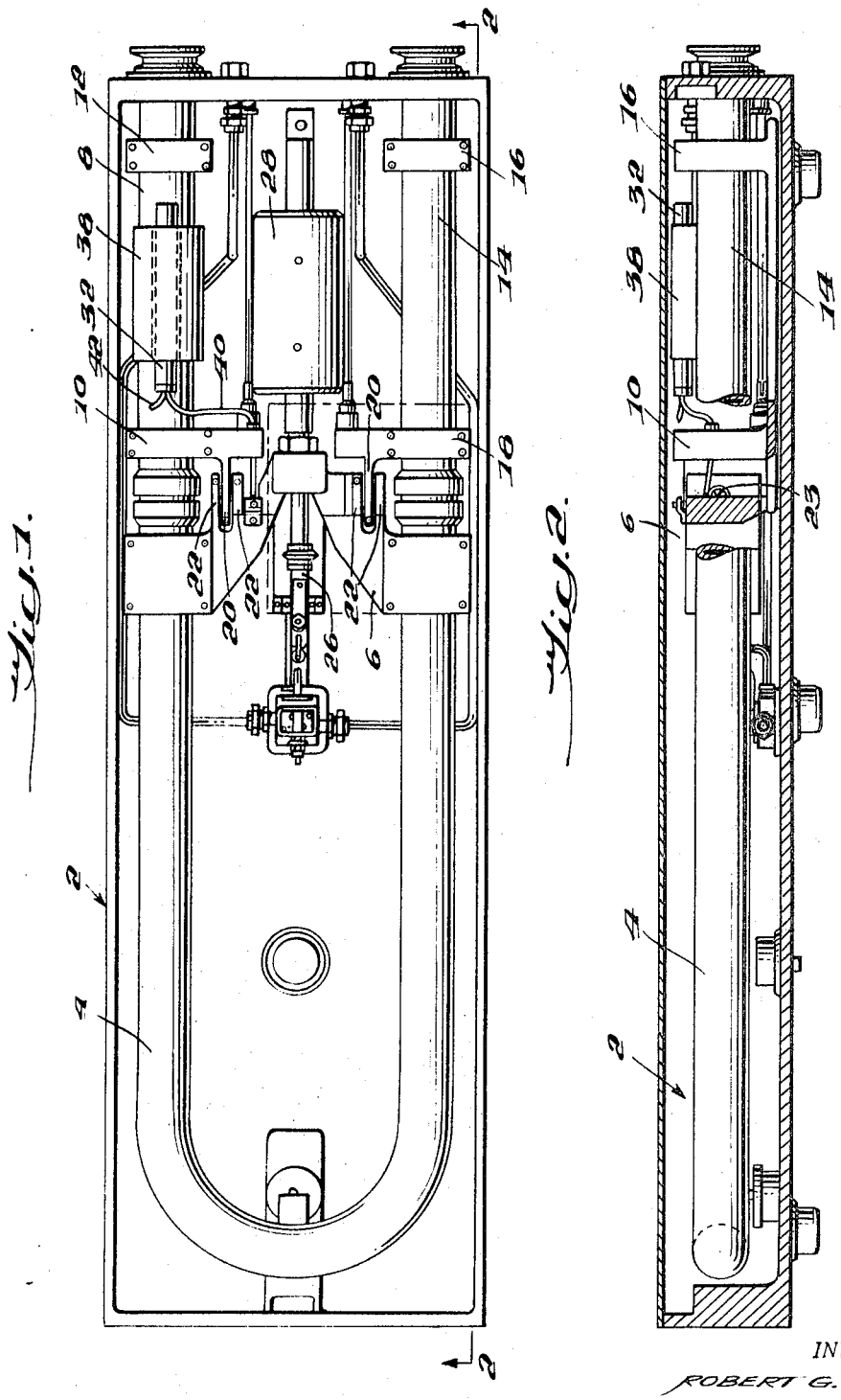
INVENTOR.
ROBERT G. LOVE,
BY

United States Patent Office 3,431,785
Patented Mar. 11, 1969

3,431,785
TEMPERATURE COMPENSATING SYSTEM FOR DENSITY METERS
Robert G. Love, Duncan, Okla., assignor to Halliburton Company, Duncan, Okla., a corporation of Delaware
Filed May 10, 1966, Ser. No. 548,902
U.S. Cl. 73—434                 10 Claims
Int. Cl. G01n 9/06

ABSTRACT OF THE DISCLOSURE

A density meter of the type having a U-tube mounted for pivoting movement about a horizontal axis. A force balance connected with the U-tube has a temperature compensating feature. A movable wall in a chamber applies a temperature compensating force to the balance system. The fluid in the chamber is in heat transfer relation with the fluid flowing through the U-tube and changes in temperature of the fluid being measured causes corresponding changes in pressure in the chamber, thereby varying the force transmitted to the balance system by the movable wall.

---

This invention relates to fluid density measuring instruments and more particularly to a temperature compensation system for continuous flow type fluid density meters.

The density of a fluid may be measured continuously as the fluid flows through a U-tube which is mounted for pivoting movement about a transverse axis. The U-tube forms a beam which is balanced mechanically, such as by a pneumatic bellows, and the force required to balance the beam is proportional to the density of the fluid in the U-tube. In a pneumatic system, the balance may be calibrated to provide a direct reading of density. If the density of the fluid flowing through the U-tube changes, the instrument indicates such changes and corrective action may be taken to restore the density of fluid to its desired value.

Density is a function of the weight and volume of a fluid. The conventional density meter assumes that the temperature of the fluid in the U-tube remains constant and therefore weight changes recorded by the balance are due only to changes in density of the fluid. When the density meter is installed in a continuous flow system, however, substantial expansion and contraction due to temperature changes of the fluid may occur while the density is being measured. If the temperature of the fluid increases, for example, the specific volume increases due to expansion of the fluid and the weight of the constant volume of fluid in the U-tube decreases. Thus, the meter indicates a substantial decrease in the density of the fluid. To avoid such errors in density readings caused by temperature variations, the operator may try to maintain the circulating fluid at a constant temperature, but in certain installations this is difficult to do.

Accordingly, it is an object of this invention to provide a temperature compensating system for density meters.

It is a further object of this invention to provide an accurate and reliable temperature compensating system for continuous flow type fluid density meters.

It is a still further object of this invention to provide a temperature compensating system for fluid density meters which may be conveniently adjusted and calibrated to record the density, as corrected for variations in temperature of the circulating fluid.

These objects are accomplished in accordance with the preferred embodiment of the invention by mounting a U-tube for pivoting movement about a transverse axis. The fluid to be measured is conducted into one end of the U-tube through a stationary inlet tube and conducted away from the opposite end of the U-tube through an outlet tube. A force balance system cooperates with the pivoting U-tube to measure the weight of the fluid passing through the U-tube. A temperature sensor in the form of a fluid container is attached to the stationary fluid inlet tube. The fluid from the container is conducted to a chamber having a movable wall which is displaced in response to changes in volume of the fluid in the container. The fluid in the container is cooled in heat transfer relation with the circulating fluid passing through the stationary inlet tube. Therefore, the fluid in the container expands and contracts in response to the temperature of the circulating fluid.

The movable wall of the chamber is connected to the pivoting U-tube assembly and imposes a force on the U-tube assembly tending to increase the downward deflection of the U-tube as the fluid in the chamber expands. The point of application of the temperature compensating force on the U-tube assembly may be adjusted relative to the pivot axis to increase or decrease the leverage of the force imposed by the temperature compensating system. The temperature compensating system can be calibrated to cancel out errors in density measurement which are caused by the temperature of the circulating fluid being above or below the reference temperature. Thus, the density reading obtained by the meter is automatically compensated for variations in temperature.

This preferred embodiment is illustrated in the accompanying drawings in which:

FIG. 1 is a top plan view of a density meter incorporating the temperature compensating system of this invention;

FIG. 2 is a cross sectional view of the density meter along the line 2—2 in FIG. 1;

Figure 3:
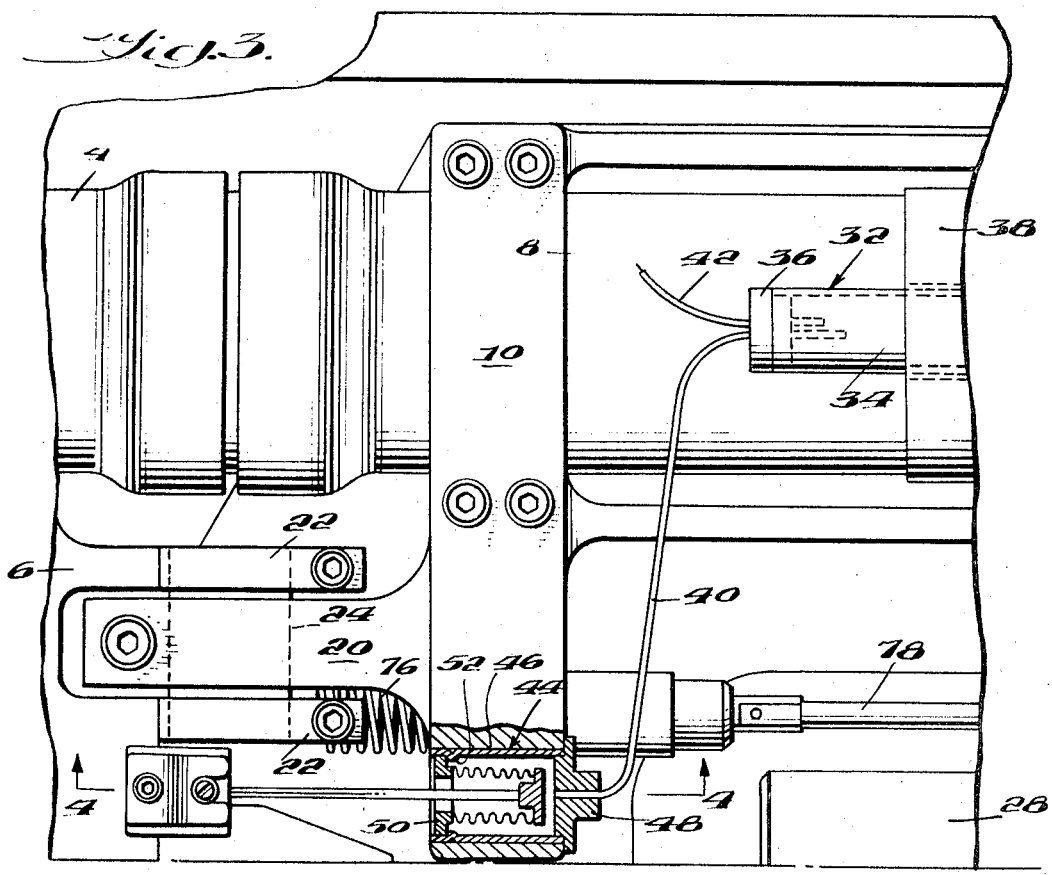
FIG. 3 is an enlarged plan view, partially in cross section, of the temperature compensating system as installed in the density meter.

Referring to FIGS. 1 and 2, the density meter of this invention is mounted in a box 2 and includes a U-tube 4 which is mounted for vertical swinging movement. The U-tube 4 is clamped in brackets on the opposite ends of a yoke 6, and the yoke is mounted for pivoting movement about a transverse axis with respect to the box 2. A fluid inlet tube 8 is mounted securely in brackets 10 and 12 and is aligned with the end of the U-tube 4. The tubes 4 and 8 have enlarged ends to receive a flexible tubular connection between the ends of the tubes. Similarly, the outlet tube 14 is mounted in brackets 16 and 18 in alignment with the outlet end of the U-tube 4. The end of the tube 14 is also flared to receive a tubular flexible connection joining the ends of the U-tube 4 and the outlet tube 14.

The brackets 10 and 18 each have a supporting arm 20 which extends between a pair of corresponding brackets 22 on the yoke 6. As shown in FIG. 2, there are aligned circular openings 23 in the arms 20 and 22. A crossed spring pivot assembly 24 is mounted in each pair of supporting arms 20 and cooperates with the respective supporting arms 16 to form a pivoting connection between the ends of the tubes 8 and 14 and the U-tube 4. The U-tube 4 pivots about the central axis of the pivot assemblies 24 which is in substantial alignment with the flexible tube joining the flared ends of the U-tube with the inlet and outlet tubes.

A restoring force tending to resist pivoting movement of the U-tube 4 is imposed on the yoke 6 by a pneumatic force balance system. Generally, the pneumatic balance system includes a beam 26 secured on one side of the yoke 6 and a counterweight 28 on the opposite side of the yoke. As the beam 26 swings downwardly due to an increase in the weight of the fluid in the tube 4, air is conducted to a bellows which exerts an upward force on the beam 26. The air pressure required to restore the beam to a balanced condition is recorded as a function of the density of fluid in the tube 4. The instrument can be calibrated to respond quickly and accurately to changes in density of the fluid passing through the tube 4. This force balance system is described and claimed in my copending application, Ser. No. 328,728, now U.S. patent 3,258,973, filed Dec. 6, 1963.

Since the weight of the fluid in the tube 4 as measured by the balance system decreases as the temperature of the fluid increases, the compensating system of this invention imposes a torque on the yoke 6 that is proportional to the temperature of the fluid in the inlet tube 8. The temperature compensating system includes a fluid container 32 which is in the form of a hollow tube 34 having a cap 36 on each end. The container 32 is clamped against the surface of the inlet tube 8 by a sheet metal clip 38. The container 32 is in heat transfer relation with the inlet tube, and preferably, the inlet tube and the container tube 34 are formed with thin metal walls for rapid transfer of heat. A conduit 40 extends through the cap 36 on one end of the tube 32. The container 32 is evacuated and then filled with a gas, such as Freon, through a tube 42. After the container is filled, the outer end of the tube 42 is pinched off and sealed.

Figure 4:
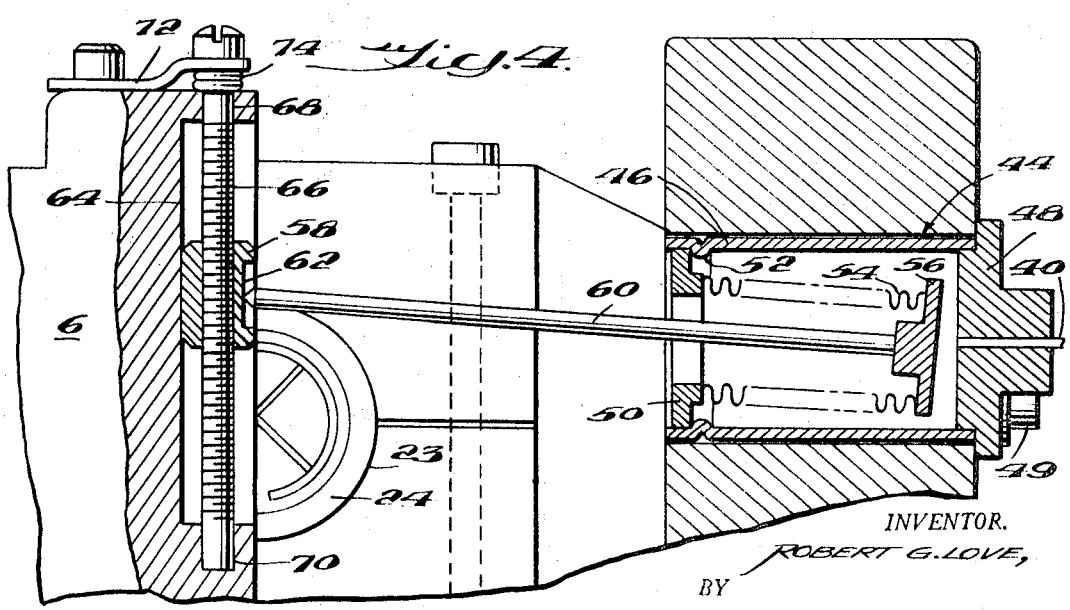
FIG. 4 is a cross sectional view of the density meter along the line 4—4 in FIG. 3.

As shown in FIGS. 3 and 4, a bellows assembly 44 is mounted in the bracket 10, adjacent the supporting arm 20. The bellows assembly 44 includes a cylindrical body 46, and a cover 48 that is secured to the end of the body 46. The cover 48 is sealed to the end of the cylindrical body 46 to prevent leakage of gas from the interior of the body 46. A cap screw 49 (FIG. 4) clamps the cover 48 against the bracket 10. At the opposite end of the body, a ring 50 is inserted in the opposite end of the body 46 and a circumferential rib 52 is formed around the body 46 to prevent displacement of the ring 50 inwardly toward the cover 48. A flexible bellows 54 is attached at one end to the ring 50 and the opposite end is secured to a circular plate 56. The bellows 54 seals the gas in the interior of the body 46 while permitting longitudinal and radial displacement of the plate 56. The bellows 54 is sufficiently rigid to provide support for the plate 56 when the cylinder body 46 is arranged horizontally as shown in FIG. 4.

A block 58 is mounted in the yoke 6 opposite the bellows assembly 44 and a rod 60 connects the block 58 with the plate 56. The rod 60 is secured at one end in the plate 56. The opposite end of the rod 60 is pointed and is received in a socket 62 formed in the block 58. The socket 62 cooperates with the pointed end of the rod 60 so that the force of the rod 60 is transmitted to the yoke 6 with a minimum of frictional drag. The block 58 is mounted in a groove 64 which extends substantially perpendicular to the central axis of the pivot assembly 24. The block 58 has a threaded hole extending through the center of the block and a screw 66 is threaded through the hole in the block 58. The screw 66 is journalled for rotation in a hole 68 in the yoke at one end of the groove 64 and in a socket 70 at the opposite end of the groove 64. The screw 66 is held in the socket 70 by a clip 72 which engages under the screwhead. A pair of washers 74 are provided on the screw 66 between the clip 72 and the surface of the yoke. By turning the screw 66, the block 58 is advanced along the groove 64 to adjust the distance between the pointed end of the rod 60 and the axis of the pivot assembly 24.

As shown in FIG. 3, a coil spring 76 engages the lower end of the bracket 22 to apply an upwardly swinging torque to the yoke. A shaft 78 projects through the box and by turning the shaft 78, the force of the spring 76 on the yoke may be adjusted. A similar adjustable spring may be provided on the opposite side of the yoke. The springs are used for adjusting the balance.

In operation, a fluid supply conduit is coupled to the inlet tube 8 from which the fluid flows through the U-tube 4 and out of the meter through the outlet tube 18. The beam 26 is balanced by adjusting the springs 76. The block 58 is displaced along the groove 64 by turning the screw 66 until the pointed end of the rod 60 is positioned at the appropriate distance from the pivot axis of the assembly 24 for the particular fluid being measured. If the temperature of the fluid in the inlet tube 8 should increase, heat is transmitted from the circulating fluid to the gas in the container 32, thereby heating and expanding the gas. As the gas expands the fluid pressure in the chamber formed by the bellows 54 and body 46 increases. Thus, the resultant force on the plate 56 of the bellows assembly 44 tends to move the rod 60 toward the left as viewed in FIG. 4. The force on the plate 56 is transmitted through the rod 60 to the block 58. Since the pivot axis is located below the pointed end of the rod 60, the force on the rod 60 imposes a torque about the pivot axis in a counterclockwise direction as viewed in FIG. 4. This torque tends to increase the apparent density of the fluid in the tube 4, as measured by the balance system. The additional torque applied by the rod 60 compensates for a decrease in density due to the increase in temperature of the fluid. Similarly, the torque imposed by the rod 60 decreases when the temperature of the fluid in the inlet 8 decreases, since the pressure of the gas on the plate 56 decreases. Since temperature and density are directly proportional to each other, the meter can be calibrated to provide a density reading which is substantially independent of changes in temperature of the circulating fluid.

The instrument is readily adjusted and calibrated merely by turning the screw 66 to apply the appropriate leverage of the temperature correction force on the pneumatic balance system. The compensating system responds rapidly to temperature changes. The recorder chart or other indicating device used with the meter can be read directly without having to apply a temperature corrective factor and changes in density can be quickly and easily detected. Therefore, corrective action can be initiated sooner, if necessary, to maintain the circulating fluid at a desired density.

While this invention has been illustrated and described in one embodiment, it is recognized that variations and changes may be made therein without departing from the invention as set forth in the claims.

I claim:
1. In a fluid density meter of the type having a fluid conduit mounted for pivoting movement about a horizontal axis and a balance mechanism for detecting pivoting movement of said conduit about said axis, a device compensating for deviations from a predetermined temperature of the fluid passing through said conduit comprising:
  (a) means for containing a temperature responsive expansible fluid, said container means being in heat transfer relation with said fluid conduit,
  (b) means forming a fluid receiving chamber, said chamber having movable wall means exposed on one side to fluid in said chamber,
  means forming fluid communication between said container means and said chamber,
  (d) means for rigidly connecting said wall means with said fluid conduit at a point spaced radially from said axis, said connecting means including a rod having one end secured on said wall means and the opposite end in abutting relation with said conduit at said point, and
  (e) means for adjusting the position of said connecting point relative to said axis, whereby said wall means is displaced in response to expansion and contraction of fluid in said container means to modify the pivoting force of said fluid conduit according to the temperature of the fluid in said fluid conduit.
2. The fluid density meter according to claim 1 wherein said wall means includes a rigid plate and flexible seal means mounting said plate for movement relative to said chamber.

3. In a fluid density meter of the type having a fluid conduit mounted for pivoting movement about a horizontal axis and a balance mechanism for detecting pivoting movement of said conduit about said axis, a device compensating for deviations from a predetermined temperature of the fluid passing through said conduit comprising:
   (a) a container for an expansible fluid,
   (b) means forming a fluid receiving chamber, said chamber having movable wall means exposed on one side to fluid in said chamber,
   (c) means forming fluid communication between said container and said chamber,
   (d) means for rigidly connecting said wall means with said fluid conduit at a point spaced radially from said axis, said wall means includes a rigid plate and flexible seal means mounting said plate for movement relative to said chamber, said connecting means including a yoke supporting said conduit and a rod secured in said plate at one end and engaging said yoke at the opposite end, and
   (e) means for positioning said container in heat transfer relation with fluid flowing through said conduit, whereby said wall means is displaced in response to expansion of fluid in said container that is heated by fluid in the conduit to modify the pivoting force of said conduit according to the temperature of the fluid being measured.

4. The fluid density meter according to claim 3 wherein said connecting means includes a block on said yoke, and means for displacing said block toward and away from said axis, said rod opposite end being in engagement with said block.

5. The fluid density meter according to claim 4 wherein said block is mounted for radial movement relative to said axis, and screw means for selectively displacing said block.

6. A temperature compensating device for balances of the type having a fluid conduit mounted for pivoting movement about a horizontal axis comprising:
   (a) a container having a fluid therein, said container fluid being expansible in response to a change in temperature of said fluid, said container being in heat transfer relation with fluid in said fluid conduit,
   (b) means forming a fluid receiving chamber, said chamber having movable wall means exposed on one side to fluid in said chamber,
   (c) means forming fluid communication between said container and said chamber and said wall means being movable in one direction in response to expansion of said container fluid,
   (d) means for supporting said fluid conduit for pivoting movement, said supporting means having a pivot axis,
   (e) a block on said supporting means, means for adjusting said block radially of said pivot axis, and
   (f) means for rigidly connecting said movable wall means and said block, whereby expansion and contraction of said container fluid changes the pressure on said movable wall and a temperature compensating force is transmitted from said movable wall to said supporting means.

7. The temperature compensating device according to claim 6 wherein said block adjusting means includes means for guiding said block substantially radially of said pivot axis, and a screw cooperating with said support means for securing said block at a selected position along said guiding means.

8. The temperature compensating device according to claim 7 wherein said block has a threaded hole therein extending substantially radially of said pivot axis, said screw being mounted for rotation relative to said support means and extending through said block threaded hole, whereby rotation of said screw displaces said block along said guiding means.

9. The temperature compensating device according to claim 6 wherein said fluid receiving chamber has a longitudinal axis, said movable wall means includes a rigid plate and flexible seal means surrounding said rigid plate whereby said plate is movable longitudinally and transversely of said chamber axis.

10. The temperature compensating device according to claim 9 wherein said connecting means includes a rod secured at one end in said plate, said block having a socket therein for receiving the opposite end of said rod.

References Cited

UNITED STATES PATENTS 3,225,603  12/1965  Stephenson et al. _____ 73—434
3,151,775  10/1964  Whitehead _____ 222—57

JAMES J. GILL, *Primary Examiner.*

V. J. TOTH, *Assistant Examiner.*

U.S. Cl. X.R.

73—30, 32